Figure 1:
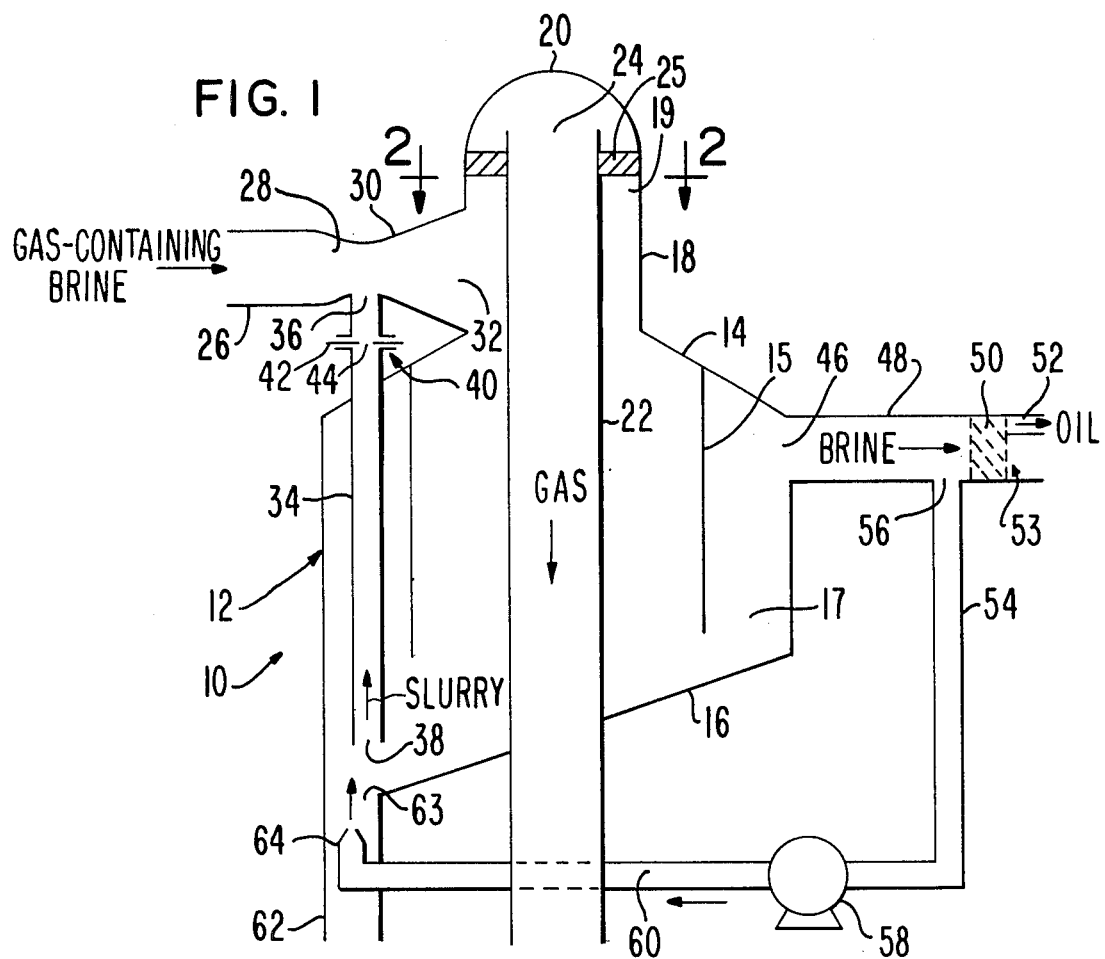

United States Patent [19]

Rogers et al.

[11] Patent Number: 4,613,338
[45] Date of Patent: Sep. 23, 1986

[54] SEPARATING GASES FROM GEOPRESSURED OR HYDROPRESSURED BRINE

[75] Inventors: Alfred N. Rogers, Pleasanton; Leon Awerbuch, San Francisco, both of Calif.

[73] Assignee: Bechtel International Corporation, San Francisco, Calif.

[21] Appl. No.: 491,685

[22] Filed: May 5, 1983

[51] Int. Cl.$^4$ .................. B01D 19/00; B01D 9/02
[52] U.S. Cl. .......................... 23/301; 55/55; 166/267
[58] Field of Search .............. 55/55, 57, 89, 191, 55/52; 203/7; 210/714; 166/267; 422/252; 23/301

[56] References Cited

U.S. PATENT DOCUMENTS

| 2,979,442 | 4/1961 | Badger | 203/7 |
| 3,331,187 | 7/1967 | Tsukagoshi | 55/89 |
| 3,340,159 | 9/1967 | Tidball et al. | 203/7 |
| 3,891,394 | 6/1975 | Smith et al. | 203/7 |
| 4,273,189 | 6/1981 | Carpenter | 55/55 |
| 4,332,592 | 6/1982 | Müller | 422/252 |

OTHER PUBLICATIONS

Matsuda et al., International Symposium on Water Desalination, 10/65, SWD/5.

Primary Examiner—Hiram H. Bernstein
Attorney, Agent, or Firm—Townsend and Townsend

[57] ABSTRACT

Apparatus and a method for separating gases and vapors from a geopressure or hydropressured brine without allowing precipitation of scale deposits on the walls of vessels and pipes. The apparatus includes a reactor having an inlet pipe provided with a Venturi throat and an expansion nozzle coupled with the throat to depressurize the brine to cause separation of the gases and vapors from the liquid and solid fractions of the brine. The gases and vapors travel out of the reactor through a central pipe extending downwardly and through the reactor. The brine in the form of a slurry gravitates in the reactor toward a first outlet pipe while clarified brine rises past an internal baffle and leaves the reactor through a second outlet pipe. A third pipe coupled to the reactor near the lower end thereof draws slurry into the Venturi throat by suction to cause mixing of incoming brine and slurry so that the solids in the slurry provide nuclei for crystallization to prevent scale deposit on the walls of adjacent structure. A part of the clarified brine is taken from the second outlet pipe and pumped to the bottom of the reactor to elutriate the finer crystals in the slurry in the reactor.

1 Claim, 2 Drawing Figures

SEPARATING GASES FROM GEOPRESSURED OR HYDROPRESSURED BRINE

This invention relates to the separation of gases and vapors from a geopressured or hydropressured brine and, more particularly, to apparatus and method for handling a brine to separate the gaseous, liquid and solid fractions from each other without scale deposits on the walls of vessels and pipes.

BACKGROUND OF THE INVENTION

In some sections of the world, natural brine existing at high pressure in subterranean formations, contains dissolved gases. The most valuable of these gases from an energy standpoint is methane which exists together with lesser amounts of other hydrocarbons. Such gases usually include, in addition, dissolved nitrogen and carbon dioxide. When the brine is brought to the surface and its pressure either partially or fully relieved, the dissolved gases escape from solution and can be separated and purified as required to yield a salable source of energy.

When the brine is depressurized, gas is released and the change in brine composition, together with any change in temperature, causes some of the dissolved constituents in the brine to precipitate. Such precipitates frequently deposit on the walls of vessels and pipes, forming scale deposits which inhibit the functioning of the equipment which handles the brine. A further problem occurs when the spent brine is injected into the earth where precipitates tend to clog injection wells and also the subterranean formations.

Because of the foregoing problems, a need has arisen for improvements in the handling of geopressured or hydropressured brine so as to permit separation of gases and vapors from the brine without the deposit of scale on adjacent wall surfaces of brine handling equipment.

SUMMARY OF THE INVENTION

The present invention is directed to apparatus and a method for treating geopressured or hydropressure brine in a manner such that gases and vapors in the brine are separated from the liquid and solid fractions thereof, yet the processing of the brine is done in a manner to avoid precipitation of scale deposits on wall surfaces of the apparatus itself. The process of the present invention operates to cause the precipitation of newly formed scale directly onto particles of a slurry of previously formed deposits. Incoming brine to the apparatus is depressurized and relieved while the contacting of brine and slurry occurs; thus, precipitation of scale deposits on wall surfaces of vessels and pipes is substantially avoided.

The apparatus includes a Venturi throat at the inlet thereof to assure complete dispersal of the slurry throughout the incoming brine without the need for pumps or turbine mixing equipment, thus reducing plant investment and power consumption. The elimination of pumps and turbine mixers has the further advantage of avoiding attrition of the slurry particles. Such attrition would delay the settling of the slurry in the brine-slurry separation step prior to the injection of the brine into an injection well.

The primary object of the present invention is to provide an improved apparatus and method for treating of brine wherein gases and vapors from the brine are separated quickly and easily from the liquid and solid fractions of the brine without causing precipitation of scale deposits on the inner wall surfaces of equipment through which the brine passes.

Another object of the present invention is to provide an apparatus and a method of the type described wherein incoming brine is simultaneously depressurized and mixed with a slurry to provide nuclei on which scale deposits can form while, at the same time, causing separation of the gases and vapors from the brine so that such gases and vapors can be directed away from the liquid and solid fractions of the brine for subsequent use at remote locations.

Other objects of this invention will become apparent as the following specification progresses, reference being had to the accompanying drawings for an illustration of the invention.

Figure 2:
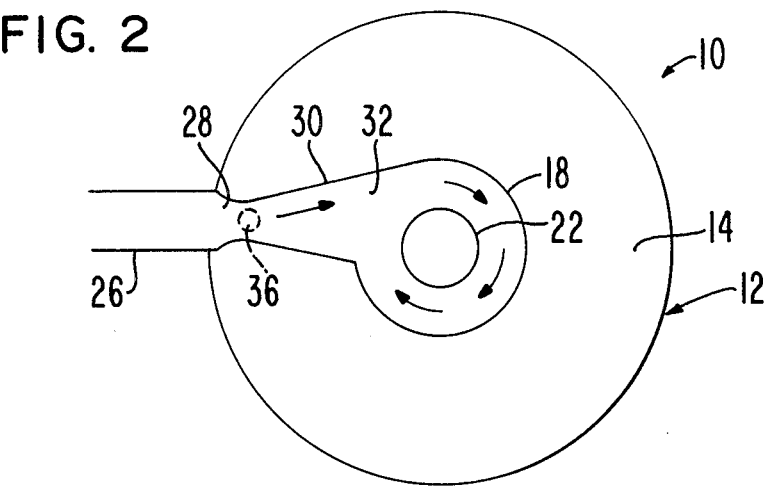

In the Drawing:

FIG. 1 is a schematic side elevational view of the reactor of the present invention for separating gas, liquids and solids from a brine entering the reactor; and FIG. 2 is a cross-sectional view taken along line 2—2 of FIG. 1.

The reactor of the present invention is broadly denoted by the numeral 10 and includes an outer, generally cylindrical body 12 having a sloping upper wall 14 and an inclined bottom wall 16. A cylindrical baffle 15 is in body 12. A tubular extension 18 which is generally cylindrical in configuration extends upwardly from the top wall 14 and has a dome shaped cover 20. A tube 22 in the center of body 12 concentric with baffle 15 has an open top 24 which extends into and communicates with the upper portion of extension 18. Tube 22 extends downwardly through body wall 16 and is adapted to be coupled at its lower end to a tank or other receiver for vapors and gases separated in reactor 10 in a manner hereinafter described. A mist eliminator 25 surrounds the upper end of pipe 22 near open top 24 thereof.

Reactor 10 has an inlet pipe 26 provided with a Venturi throat 28 and an expanding nozzle 30, nozzle 30 being coupled to extension 18 at a side opening 32 thereof. A pipe 34 has an open upper end 36 communicating with Venturi throat 28, pipe 34 having a lower open end 38 communicating with the interior of body 12 near the lower extremity of bottom wall 16 as shown in FIG. 1.

Pipe 34 has means 40 for providing an adjustable orifice for the flow of fluid through the pipe toward Venturi throat 28. For purposes of illustration, means 40 includes a plate 42 having an orifice 44 therethrough. Plate 42 is removable from attachment to pipe 28 so that another plate having an orifice of a different size can be inserted in the position of plate 42 in FIG. 1. In this way, the volume rate of flow of fluid through the orifice toward Venturi throat 28 can be controlled.

Body 12 has an outlet opening 46, and an outlet pipe 48 communicates with opening 46 for directing a fluid flow out of body 12. A filter 50 is carried in pipe 48 to remove oil entrained in the fluid flowing outwardly through pipe 48. The filter has a fluid passage 52 associated therewith so that oil entrained in the fluid flow can be trapped by the filter and moved out of the filter through passage 52. The remaining aqueous fluid, which has been substantially stripped of its oil contaminant, is discharged through an outlet 53, the bottom portion of the discharge conduit of FIG. 1.

A pipe 54 has an open upper end 56 communicating with pipe 48. Pipe 54 has a pump 58 coupled therewith and a pipe 60 coupled to the downstream end of pump 58 is coupled to a drain pipe 62 coupled to body 12 at the lower extremity of bottom wall 16. A nozzle 64 on pipe 60 is used to direct fluid pumped away from pipe 48 into body 12.

In operation, a gas-containing brine enters reactor 10 through pipe 26. In passing through Venturi throat 28, the brine entrains previously formed slurry drawn by suction into Venturi throat 28 from pipe 34. This flow of slurry is from the lower end of body 12 though the lower open end 38 of pipe 34. The volume rate of flow of slurry is controlled by means of orifice 44. Moreover, the pressure on the incoming brine is released somewhat by passage of the brine through nozzle 30 which expands as it approaches extension 18. The depressurized brine is admitted tangentially to the interior of extension 18 as shown in FIG. 2 and flows therein in a circular path as indicated by the arrows in FIG. 2.

The gas and vapor, aided by centrifugal force due to the circular movement of the brine in extension 18, separates from the brine in extension 18, specifically in the cylindrical space 19 below mist eliminator 25. The separated gas and vapor rise and pass through mist eliminator 25 and then into the interior of the dome shaped upper end of extension 18. The gas and vapor then pass downwardly through the open upper end 24 of pipe 22, then through pipe 22 downwardly and out of the pipe to a tank or other receiver for purification and use. In this way, gases, such as methane, are separated from the brine and are available for any one of a number of different uses.

The brine which separates from the vapor and gas in extension 18 falls into body 12 along the inner surface of cylindrical baffle 15 which is open at its lower end, such lower end being spaced upwardly from bottom wall 16. The descending brine passes under the lower edge of baffle 15 and into the annular space 17 surrounding baffle 15. Since the regions inside and outside of baffle 15 are relatively large, they retain the brine and slurry for an extended period of time, ranging from 10 seconds to 25 minutes, depending upon temperature, pressure and brine chemistry. During this retention period, suspended crystals in the brine and slurry continue to grow to a size at which the crystals will settle readily from the brine while the supersaturation of the scaling species is almost completely relieved.

A substantial fraction of the suspended solids settle in annular region 17 and finally move downwardly along the upper surface of bottom 16 toward the open upper end 63 of pipe 62. Brine, clarified to a major extent, rises in space 17 and is discharged by pipe 48 through outlet opening 46. A small fraction of the brine is recycled by pipe 54, through pump 58 and back to the upper end of discharge pipe 62. The recycled brine, entering by way of nozzle 64, countercurrent to the discharging slurry, serves to elutriate the finer crystals, carrying them back into the settling region 17 to allow them time for additional growth. This elutriation produces a discharged slurry which is more readily thickened and filtered to produce a cake suitable for disposal or for recovery of valuable mineral constituents. Before discharge from reactor 10, the clarified brine is sent through oil separation filter 50 to remove oil entrained therein. The separated oil is discharged from filter 50 through tube 52.

The present invention as described hereinabove provides apparatus and a method to separate gas and vapors from brine and slurry and to allow for separation of clarified brine from the slurry itself. All of the foregoing can be achieved by protecting the gas separation equipment and piping from excessive scale deposition and by avoiding harmful precipitation in an injection well and subterranean formation.

What is claimed is:

1. A method of separating gases from geopressured or hydropressured brine comprising: moving incoming geopressured or hydropressured brine along a circular path into a first zone to cause separation of gases from the remainder of the brine by centrifugal force; allowing the separated gases to move in one direction to a second zone while permitting the remainder of the brine to gravitate to a third zone; removing the separated gases from the second zone; dividing the remainder of the brine into a clarified liquid fraction and a slurry; removing the clarified liquid fraction from the third zone; moving a portion of the slurry in the third zone into the path of flow of the incoming brine flowing toward the first zone and directing a portion of the clarified brine into the slurry in the second zone to cause elutriation in the second zone.

* * * * *